US008931728B1

(12) United States Patent
van der Westhuizen (10) Patent No.: US 8,931,728 B1
(45) Date of Patent: Jan. 13, 2015

(54) FAIL SAFE, MULTIPLE SOURCE, TIP-JET SUPPLY APPARATUS AND METHOD

(75) Inventor: Jacob Johannes van der Westhuizen, South Jordan, UT (US)

(73) Assignee: Groen Brothers Aviation, Inc., Salt Lake City, UT (US)

( * ) Notice: Subject to any disclaimer, the term of this patent is extended or adjusted under 35 U.S.C. 154(b) by 455 days.

(21) Appl. No.: 13/199,682

(22) Filed: Sep. 7, 2011

Related U.S. Application Data

(60) Provisional application No. 61/403,099, filed on Sep. 9, 2010, provisional application No. 61/403,097, filed on Sep. 9, 2010, provisional application No. 61/381,313, filed on Sep. 9, 2010, provisional application No. 61/403,111, filed on Sep. 9, 2010, provisional application No. 61/460,572, filed on Jan. 3, 2011, provisional application No. 61/403,081, filed on Sep. 9, 2010, provisional application No. 61/403,135, filed on Sep. 9, 2010, provisional application No. 61/466,177, filed on Mar. 22, 2011, provisional application No. 61/403,113, filed on Sep. 9, 2010, provisional application No. 61/409,478, filed on Nov. 2, 2010, provisional application No. 61/409,470, filed on Nov. 2, 2010, provisional application No. 61/517,413, filed on Apr. 19, 2011, provisional application No. 61/468,964, filed on Mar. 29, 2011, provisional application No. 61/456,220, filed on Nov. 2, 2010, provisional application No. 61/519,075, filed on May 16, 2011, provisional application No. 61/519,055, filed on May 16, 2011.

(51) Int. Cl.
*B64C 27/18* (2006.01)
*B64C 27/02* (2006.01)
*B64C 27/26* (2006.01)

(52) U.S. Cl.
CPC ............... *B64C 27/18* (2013.01); *B64C 27/025* (2013.01); *B64C 27/26* (2013.01)
USPC ........................... 244/17.11; 244/6; 416/20 R (58) Field of Classification Search
USPC ....... 244/6, 7 R, 7 A, 17.11, 17.19; 416/20 R, 416/20 A, 21, 22, 90 R, 90 A, 92; 415/80, 82
See application file for complete search history.

(56) References Cited

U.S. PATENT DOCUMENTS

| | | | |
|---|---|---|---|
| 2,601,463 A | 6/1952 | Stanley | |
| 2,674,421 A * | 4/1954 | De Cenzo | 244/7 A |
| 3,084,889 A * | 4/1963 | Irbitis | 244/55 |
| 3,215,366 A * | 11/1965 | Stephens | 244/7 R |
| 3,494,424 A | 2/1970 | Stanley | |
| 3,517,898 A * | 6/1970 | Laville et al. | 244/7 R |
| 4,589,611 A | 5/1986 | Ramme et al. | |
| 5,934,873 A | 8/1999 | Greene | |
| 5,984,635 A * | 11/1999 | Keller | 416/20 A |
| 6,382,560 B1* | 5/2002 | Ow | 244/23 C |
| 6,789,764 B2* | 9/2004 | Bass et al. | 244/10 |
| 7,147,182 B1 | 12/2006 | Flanigan | |

(Continued)

*Primary Examiner* — Joseph W Sanderson
(74) *Attorney, Agent, or Firm* — Pate Baird, PLLC (57) ABSTRACT

A rotorcraft is disclosed. The rotorcraft may include an airframe and a rotor connected to the airframe. The rotor may include a hub and at least one rotor blade having a tip jet. The rotorcraft may further include a plurality of compressors for generating compressed air and a network of conduits connecting the outlets of the plurality of compressors with every tip jet of the rotor. The rotorcraft may further include a control system preventing back flow through each outlet of the plurality of compressors.

19 Claims, 6 Drawing Sheets

(56) References Cited

U.S. PATENT DOCUMENTS

| | | | |
|---|---|---|---|
| 7,624,942 B2 * | 12/2009 | Roberge | 244/7 A |
| 7,871,032 B2 * | 1/2011 | Zhao et al. | 244/6 |
| 8,205,821 B2 * | 6/2012 | Peck | 244/7 A |
| 2009/0032638 A1 * | 2/2009 | Zhao et al. | 244/6 |

* cited by examiner

FAIL SAFE, MULTIPLE SOURCE, TIP-JET SUPPLY APPARATUS AND METHOD

RELATED APPLICATIONS

This application claims the benefit of U.S. Provisional Patent Application Ser. No. 61/403,099, filed on Sep. 9, 2010, U.S. Provisional Patent Application Ser. No. 61/403,097, filed on Sep. 9, 2010, U.S. Provisional Patent Application Ser. No. 61/381,313, filed on Sep. 9, 2010, U.S. Provisional Patent Application Ser. No. 61/403,111, filed on Sep. 9, 2010, U.S. Provisional Patent Application Ser. No. 61/460,572, filed on Jan. 3, 2011, U.S. Provisional Patent Application Ser. No. 61/403,081, filed on Sep. 9, 2010, U.S. Provisional Patent Application Ser. No. 61/403,135, filed on Sep. 9, 2010, U.S. Provisional Patent Application Ser. No. 61/466,177, filed on Mar. 22, 2011, U.S. Provisional Patent Application Ser. No. 61/403,113, filed on Sep. 9, 2010, U.S. Provisional Patent Application Ser. No. 61/409,478, filed on Nov. 2, 2010, U.S. Provisional Patent Application Ser. No. 61/409,470, filed on Nov. 2, 2010, U.S. Provisional Patent Application Ser. No. 61/517,413, filed on Apr. 19, 2011, U.S. Provisional Patent Application Ser. No. 61/468,964, filed on Mar. 29, 2011, U.S. Provisional Patent Application Ser. No. 61/456,220, filed on Nov. 2, 2010, U.S. Provisional Patent Application Ser. No. 61/519,075, filed on May 16, 2011, and U.S. Provisional Patent Application Ser. No. 61/519,055, filed on May 16, 2011, all of which are hereby incorporated by reference.

Additionally, this patent application hereby incorporates by reference U.S. Pat. No. 5,301,900 issued Apr. 12, 1994 to Groen et al., U.S. Pat. No. 1,947,901 issued Feb. 20, 1934 to J. De la Cierva, and U.S. Pat. No. 2,352,342 issued Jun. 27, 1944 to H. F. Pitcairn.

BACKGROUND

1. The Field of the Invention

This invention relates to rotorcraft and, more particularly, to novel systems and methods for securely supplying combustion air to tip jets on rotorcraft.

2. The Background Art

Rotorcraft rely on a rotating wing to provide lift. In contrast, fixed-wing aircraft rely on air flow over a fixed wing to provide lift. Fixed-wing aircraft must therefore achieve a minimum ground velocity on takeoff before the lift on the wing is sufficient to overcome the weight of the plane. Fixed-wing aircraft therefore generally require a long runway along which to accelerate to achieve this minimum velocity and takeoff.

In contrast, rotorcraft can take off and land vertically or along short runways inasmuch as powered rotation of the rotating wing provides the needed lift. This makes rotorcraft particularly useful for landing in urban locations or undeveloped areas without a proper runway.

The most common rotorcraft in use today are helicopters. A helicopter typically includes an airframe, housing an engine and passenger compartment, and a rotor, driven by the engine, to provide lift. Forced rotation of the rotor causes a reactive torque on the airframe. Accordingly, conventional helicopters require either two counter rotating rotors or a tail rotor in order to counteract this reactive torque.

Another type of rotorcraft is the autogyro. An autogyro aircraft derives lift from an unpowered, freely rotating rotor comprising two or more rotor blades. The energy to rotate the rotor results from a windmill-like effect of air passing through the underside of the rotor (i.e., autorotation of the rotor). The Bernoulli effect of the airflow moving over the rotor blade surface creates lift. The forward movement of the aircraft comes in response to a thrusting engine such as a motor driven propeller mounted fore or aft.

During the early years of aviation, autogyro aircraft were proposed to avoid the problem of aircraft stalling in flight and to reduce the need for runways. In autogyro aircraft, the relative airspeed of the rotor blades may be controlled or influenced somewhat independent of the forward airspeed of the autogyro, allowing slow ground speed for takeoff and landing, and safety in slow-speed flight.

Various autogyro devices in the past have provided some means to begin rotation of the rotor prior to takeoff (i.e., prerotation). Prerotation may minimize the takeoff distance down a runway. One type of autogyro is the "gyrodyne." Examples of such aircraft are the XV-1 convertiplane tested in 1954 and the Rotodyne built by Fairey Aviation in 1962. The gyrodyne includes a thrust source providing thrust in a flight direction and a rotor providing autorotative lift at cruising speeds. Jet engines located on the tip of each rotor blade provided rotation of the rotor during takeoff, landing, and hovering.

Although typical rotorcraft provide the significant advantage of vertical takeoff and landing (VTOL), they are much more limited in their maximum flight speed than are fixed-wing aircraft. One reason that prior rotorcraft are unable to achieve high flight speed is a phenomenon known as "retreating blade stall."

In a fixed-wing aircraft, all wings move forward in fixed relation with respect to one another and the airframe. However, as a rotorcraft moves in a flight direction, rotation of the rotor causes each blade thereof to be either "advancing" or "retreating." A blade is advancing if it is moving in the same direction as the flight direction. A blade is retreating if it is moving opposite the flight direction. Thus, the velocity of any point on any blade is the velocity of that point, with respect to the airframe, plus the velocity of the airframe.

Rotor blades are airfoils that provide lift based on the speed of air flow thereover. Accordingly, the advancing blade typically experiences much greater lift than the retreating blade. If left uncheck, this disproportionate lift may render the rotorcraft unflyable. One solution to this problem is allowing the rotor blades to "flap." Flapping enables rotorcraft to travel in a direction substantially perpendicular to the axis of rotation of the rotor.

With flapping, an advancing blade is allowed to fly or flap upward in response to the increased air speed thereover, thereby reducing the blade's angle of attack. This, in turn, reduces the lift generated by the advancing blade. A retreating blade experiences less air speed and tends to fly or flap downward such that its angle of attack is increased. This, in turn, increases the lift generated by the retreating blade. In this manner, flapping balances the lift generated by the advancing and retreating blades.

However, lift equalization due to flapping is limited by retreating blade stall. As noted above, flapping of the rotor blades increases the angle of attack of the retreating blade. At certain higher speeds in the direction of flight, the increase in the blade angle of attack required to equalize lift results in loss of lift (stalling) of the retreating blade.

A second limit on the speed of rotorcraft is the drag at the tips of the rotor blades. The tip of the advancing blade is moving at a speed equal to the speed of the aircraft relative to the surrounding air, plus the speed of the tip of the blade with respect to the aircraft. Thus, the speed at the tip of an advancing blade is equal to the sum of the flight speed of the rotorcraft plus the product of the length of the blade and the angular velocity of the rotor.

In helicopters, the rotor must rotate to provide both upward lift and thrust in the direction of flight. Increasing the speed of a helicopter increases the air speed at the tip, both because of the increased flight speed as well as the increased angular velocity of the rotors required to provide supporting thrust. The speed at the tip of the advancing blade could therefore approach the speed of sound, even when the flight speed of the rotorcraft was actually much less. As the air speed over the tip approaches the speed of sound, the drag on the blade becomes greater than the engine can overcome. Accordingly, helicopters are quite limited in how fast they can fly.

In autogyro aircraft, the tips of the advancing blades are also subject to this increased drag, even for flight speeds much lower than the speed of sound. The tip speed for an autogyro is typically smaller than that of a helicopter, for a given airspeed, since the rotor is not driven. Nevertheless, the same drag increase occurs eventually.

A third limit on the speed of rotorcraft is reverse air flow over the retreating blade. As noted above, the retreating blade is traveling opposite the flight direction with respect to the airframe. At certain high speeds in the direction of flight, portions of the retreating blade may move rearward, with respect to the airframe, slower than the flight speed of the airframe. Accordingly, the direction of air flow over those portions of the retreating blade is reversed from that typically designed to generate positive lift.

Rather then generating positive lift, reverse air flow may impose negative lift, or a downward force, on the retreating blade. That is, an airfoil with positive angle of attack in a first direction has a negative angle of attack in a second direction, opposite the first direction.

The ratio of air speed of a rotorcraft in the direction of flight to the maximum corresponding air speed at the tips of the rotor blades is known as the "advance ratio." The maximum advance ratio of currently available rotorcraft is less than 0.5. For most helicopters, the maximum achievable advance ratio is between about 0.3 and 0.4. Accordingly, current rotorcraft are limited to a top flight speed of about 200 miles per hour (mph) or less.

In view of the foregoing, it would be an advancement in the art to provide a rotorcraft capable of vertical takeoff and landing and flight speeds well in excess of 200 mph. It would also be an advancement in the art to provide a system and method for powering a rotor that is failsafe, ease to maintain, and lightweight.

BRIEF SUMMARY OF THE INVENTION

In view of the foregoing, in accordance with the invention as embodied and broadly described herein, a method and apparatus are disclosed in one embodiment of the present invention as including a rotorcraft. In selected embodiments, a rotorcraft may include one or more rotors powered by tip jets. That is, each rotor may include multiple rotor blades that each include a tip jet (i.e., a small jet engine located proximate the tip of the rotor blade) for powering rotation of a rotor during takeoff, landing, hovering, flight, etc.

When thrust from the tip jet is needed, compressed air may be feed to the tip jet through a conduit formed within the corresponding rotor blade. This interior conduit may extend from the root to the tip of the rotor blade. A hub of a rotor may act as a manifold, feeding compressed air into the interior conduits of the various rotor blades. Fuel may also be feed through the rotor blade to the tip jet.

In selected embodiments, a system in accordance with the present invention may include multiple air sources (e.g., generators of compressed air), a duct system interconnecting all air sources and all tip jets, and a control subsystem comprising various valves and controls regulating airflow and preventing back flow into an air source that is not running properly. Suitable sources of compressed air may include exhaust gas from a jet engine, air bled from the compressor portion of a jet engine, air from the fan of a turbofan engine (i.e. bypass air), air compressed by a dedicated, single purpose engine or motor, and the like.

A source of compressed air may also include a turboprop engine driving a propeller on one side air and a compressor on the other. In such an embodiment, the compressor may be connected to the engine via a clutch. When air from the compressor is no longer needed, the compressor may be disengaged from the engine. Accordingly, a rotorcraft in accordance with the present invention may be equipped with one or more engines providing thrust, compressed air for the tip jets, or both.

Rotorcraft utilizing one or more rotors powered by tip jets may not require a tail rotor, as there may be substantially no torque between the rotor or rotors and the airframe. Additionally, unlike tilt-rotor aircraft like the Bell-Boeing V-22 Osprey, rotorcraft in accordance with the present invention do not require complex and heavy transmissions and interconnecting drive shafts to make sure both rotors keep turning in the event one engine fails. Instead, they include simple, light ducting. Accordingly, rotorcraft in accordance with the present invention may be less complex, easier to maintain, and lighter in weight. Moreover, systems in accordance with the present invention may be installed on all sizes of rotorcraft and have an even greater weight advantage on larger rotorcraft.

Safe and continuous hover, forward flight, and the like require safe and continuous powering of the one or more rotors of a rotorcraft. Accordingly, systems in accordance with the present invention may continue to provide sufficient compressed air to the tip jets after the failure of one of the sources of the compressed air. For example, should an engine fail, the other engines providing compressed air may operate at over one hundred percent performance for a period of time sufficient for a safe landing of the rotorcraft. Alternatively, or in combination therewith, fuel may be provided to the tip jets at a greater rate, enabling the tip jets to operate at higher than normal performance over the same period of time. Accordingly, with more sources of additional, emergency power, systems in accordance with the present invention may more easily cope with engine failure than current twin engine rotorcraft.

In view of the foregoing, systems in accordance with the present invention may be applied to all rotorcraft. They may make multi-engine rotorcraft safer than conventional transmission driven rotorcraft. They eliminate the need for the transmissions and connecting drive shafts of current helicopters and benefit from the resulting reductions in weight, service and maintenance time, and service and maintenance cost. In general, the larger the rotorcraft, the larger the weight savings provided by the present invention.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF SELECTED EMBODIMENTS

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of the invention. The illustrated embodiments of the invention will be best understood by reference to the drawings, wherein like parts are designated by like numerals throughout.

Figure 1:
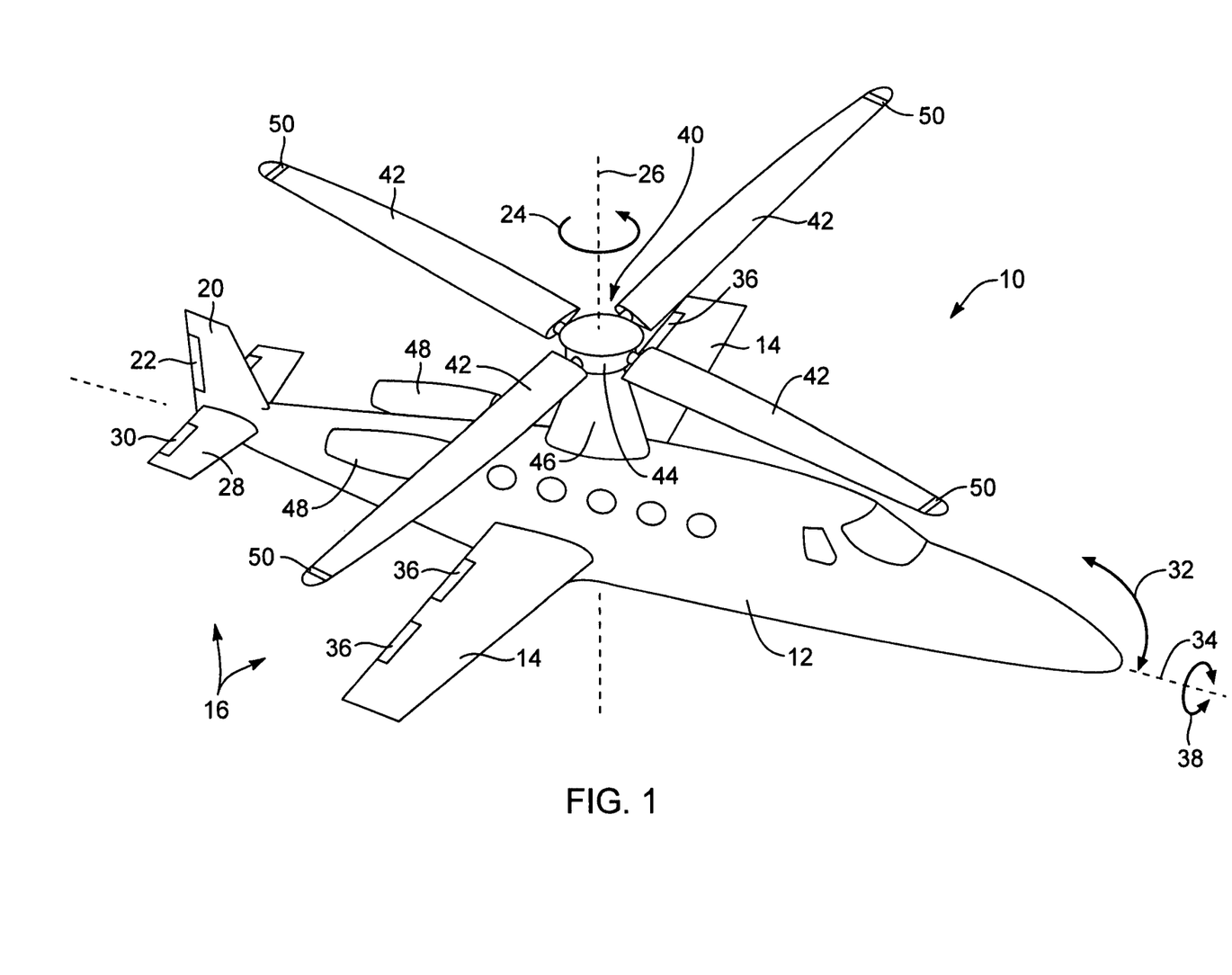
FIG. 1 is a perspective view of a rotorcraft in accordance with one embodiment of the present invention, the rotorcraft having two engines and one rotor.

Referring to FIG. 1, a rotorcraft 10 in accordance with the present invention may include an airframe 12 defining a cabin for carrying an operator, passengers, cargo, or the like. The airframe 12 may include one or more fixed wings 14 or airfoils 14 providing lift to the rotorcraft 10. The wings 14 may be configured such that they provide sufficient lift to overcome the weight of the rotorcraft 10 (or any significant portion thereof) only at comparatively high speeds.

That is, a rotorcraft 10 may be capable of vertical takeoff and landing (VTOL) and may not need lift from the fixed wings 14 at low speeds (e.g., below 50 mph or even 100 mph). Accordingly, the wings 14 may be made smaller than those of fixed-wing aircraft requiring a high velocity takeoff. The smaller wings 14 may result in lower drag at higher velocities. In some embodiments, the wings 14 may provide sufficient lift to support at least 50 percent, preferably about 90 percent, of the weight of the rotorcraft 10 at air speeds above 200 mph.

Control surfaces 16 may form part of an airframe 12. For example a tail structure 18 may include one or more vertical stabilizers 20 and one or more rudders 22. The rudders 22 may be adjustable to control yaw 24 of the rotorcraft 10 during flight. As known in the art, yaw 24 is defined as rotation about a vertical axis 26 of the rotorcraft 10. In the illustrated embodiment, the rudders 22 may comprise hinged portions of the vertical stabilizers 20.

The tail structure 18 may further include a horizontal stabilizer 28 and an elevator 30. The elevator 30 may be adjustable to alter pitch 32 of the rotorcraft 10. As known in the art, pitch 32 is defined as rotation about an axis extending laterally with respect to the airframe 10. In the illustrated embodiment, the elevator 30 is a hinged portion of the horizontal stabilizer 28. In some embodiments, twin rudders 22 may be positioned at an angle relative to the vertical axis 26 and serve both to adjust or control yaw 24 and pitch 32 of the rotorcraft 10.

The control surfaces 16 may also include ailerons 36 on the wings 14. Ailerons 36 may be used to control roll 38 of the rotorcraft 10. As known in the art, roll 38 is defined as rotation about the longitudinal axis 34 of the rotorcraft 10.

Lift during vertical takeoff and landing, and for augmenting lift of the wings 14 during flight, may be provided by a rotor 40. A rotor 40 may comprise a number of individual rotor blades 42 extending radially away from a hub 44. The hub 44 may be coupled to a mast 46. The mast may extend to connect the hub 44 to the rest of the airframe 12.

Figure 2:
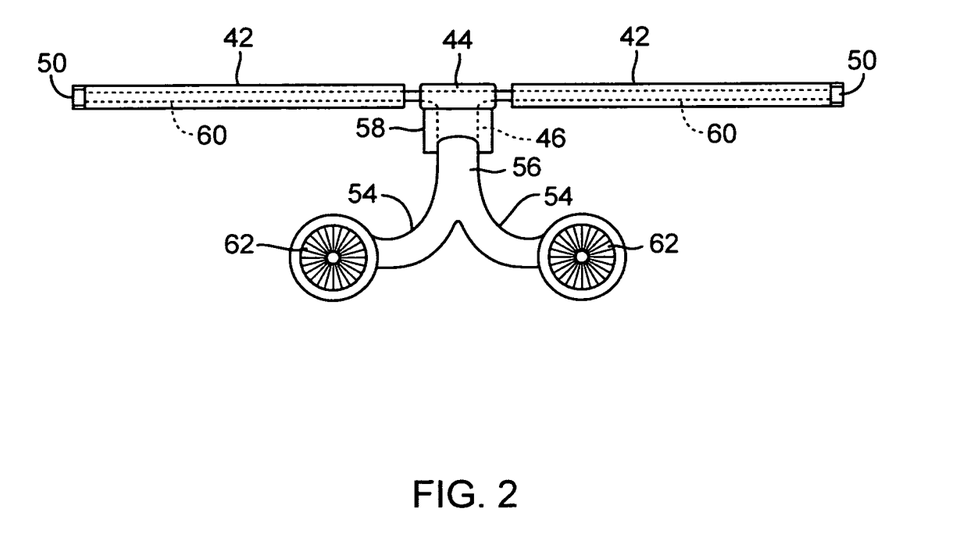
FIG. 2 is a schematic front elevation view of a compressed or otherwise pressurized air supply for tip jets in accordance with one embodiment of the present invention.

Referring to FIG. 2, a rotor 40 may be coupled to one or more engines 48 housed in a fuselage portion of the airframe 12 or in one or more adjacent nacelles. The engines 48 may provide thrust during flight of the rotorcraft 10. The engines 48 may also generate compressed air for the tip jets 50.

For example, in selected embodiments, the engines 48 may comprise one or more bypass turbines 62. All or a portion of the bypass air from the turbines 62 may be directed to the tip jets 50. Alternatively, the engines 48 may drive one or more auxiliary compressors, which in turn may provide the compressed air for the tip jets 50. In still other embodiments, all or a portion of the compressed air may be generated by one or more dedicated, single purpose engines, motors, or the like. Using the compressed air, the tip jets 50 may power the rotor 40 during takeoff, landing, hover, or whenever the flight speed of the rotorcraft 10 is too low for sufficient lift from autorotation of the rotor 40.

In selected embodiments, the compressed air generated by the engines 48 may be conducted to the tip jets 50 via one or more conduits or ducts 54, 55. For example, bypass air from one or more bypass turbines 62 may be transmitted through ducts 54 to a plenum 56. The plenum 56 may be in fluid communication via ducting 55 with a mast 46 that is hollow or has another passage to provide for air conduction. For example, a mast fairing 58 positioned around the mast 46 may provide one or both of an air channel and a low drag profile for the mast 46. The mast 46 or mast fairing 58 may be in fluid communication with a hub 44. Finally, the hub 44 may be in fluid communication with an interior conduit 60 within each of the various rotor blades 42. Accordingly, the compressed air may travel radially within the interior conduits 60 to feed the corresponding tip jets 50.

Figure 3A:
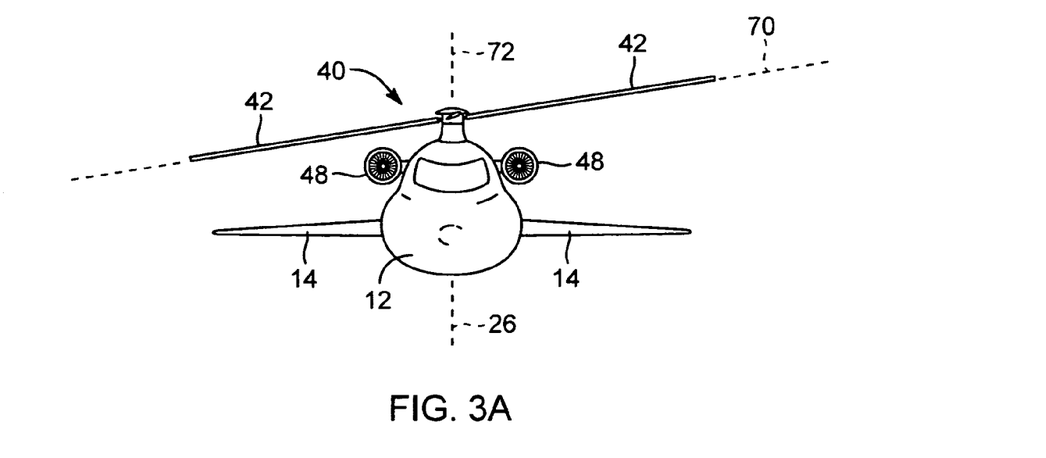
FIG. 3A is a front elevation view of a rotorcraft illustrating operational parameters describing a rotor configuration suitable for use in accordance with the present invention and the system of FIGS. 1 and 2 in particular.
Figure 3B:
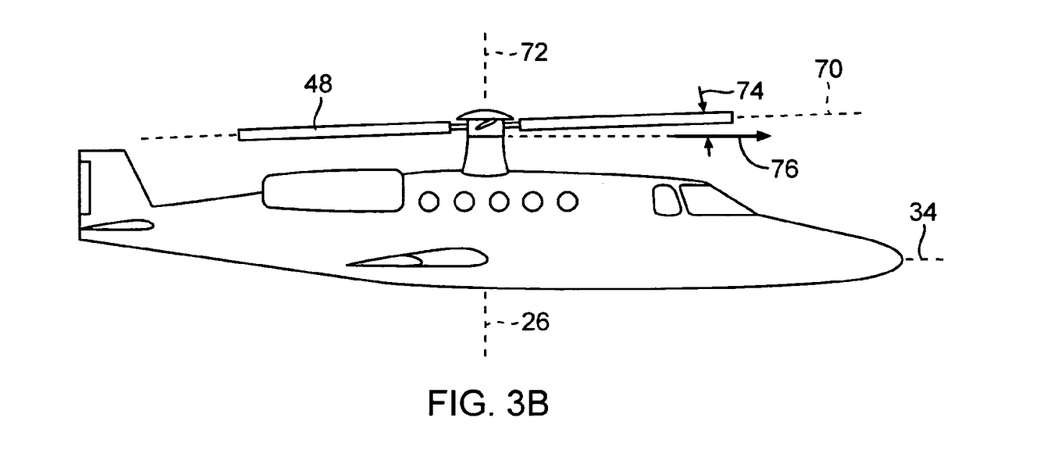
FIG. 3B is a right side elevation view of the rotorcraft of FIG. 3A.
Figure 3C:
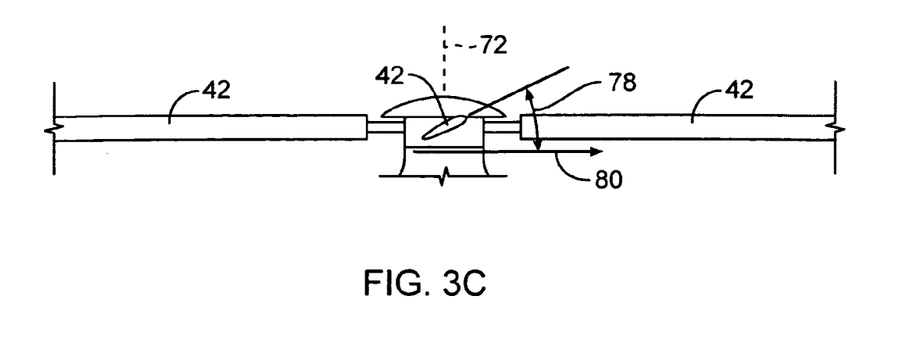
FIG. 3C is a partial cut of a right side elevation view of the rotor of FIG. 3A.

Referring to FIGS. 3A-3C, rotation of the rotor 40 about its axis of rotation occurs in a rotor disc 70 that is generally planar but may be contoured due to flexing of the blades 42. In general, the rotor disc 70 may be defined as a space in which the tips of the blades 42 travel. Inasmuch as the blades 42 flap cyclically upward and downward due to changes in lift while advancing and retreating, the rotor disc 70 may be angled or contoured with respect to the axis of rotation when viewed along the longitudinal axis 34, as shown in FIG. 3A.

Referring to FIG. 3B, the angle 74 of the rotor disc 70, relative to a flight direction 76 in the plane containing the longitudinal axis 34 and vertical axis 26, is defined as the rotor angle of attack 74 or rotor disk angle of attack 74. For purposes of this application, flight direction 76 and air speed refer to the direction and speed, respectively, of the airframe 12 of the rotorcraft 10 relative to surrounding air. In autogyro systems, the angle of attack 74 of the rotor disc 70 is generally positive in order to achieve autorotation of the rotor 40 and the resulting lift.

Referring to FIG. 3C, the surfaces of the rotor blades 42, and particularly the chord of each blade 42, define a pitch angle 78, or blade angle of attack 78, relative to the direction of movement 80 of the rotor blades 42. In general, a higher pitch angle 78 will result in more lift and higher drag on the rotor blade 42, up to the point where stalling occurs (at which point lift has declined below a value necessary to sustain flight). The pitch angle 78 of the rotor blade 42 may be manipulated by both cyclic and collective pitch controls.

Figure 4:
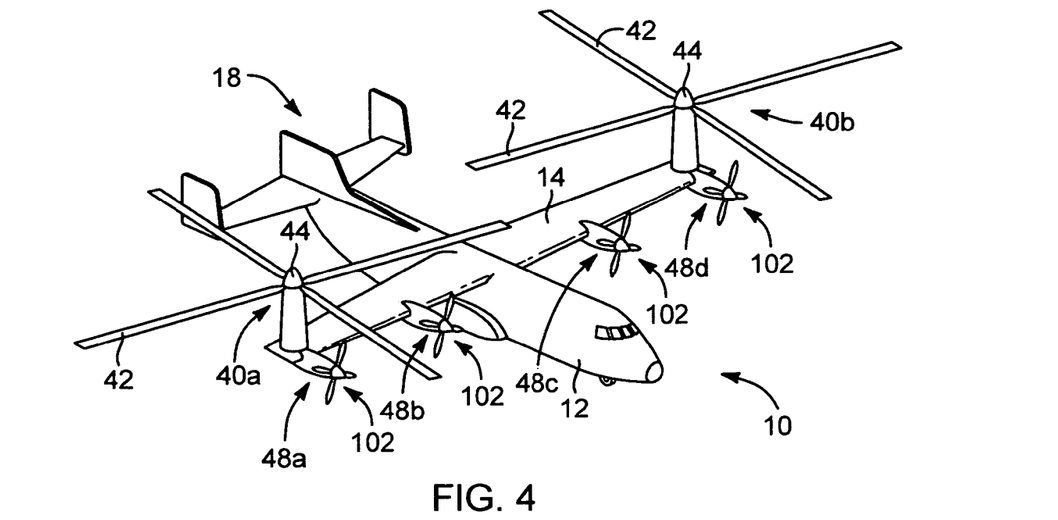
FIG. 4 is a perspective view of an alternative embodiment of a rotorcraft in accordance with the present invention, the rotorcraft having four engines and two four-bladed rotors, the two rotors spaced laterally.
Figure 5:
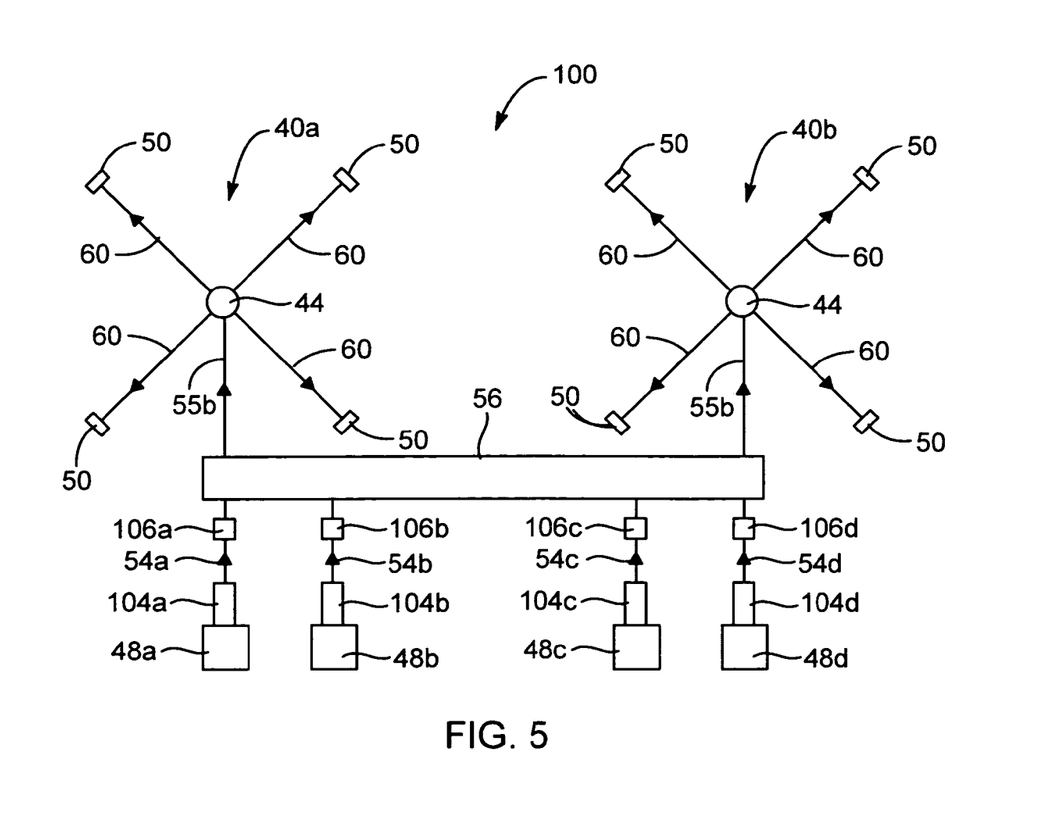
FIG. 5 is a schematic diagram of one embodiment of a compressed air system for use in the rotorcraft of FIG. 4.

Referring to FIGS. 4 and 5, a compressed air system 100 in accordance with the present invention may include multiple sources or generators of compressed air. For example, as shown in the illustrated embodiment, a rotorcraft 10 may include four engines 48a, 48b, 48c, 48d generating forward thrust. The engines 48 may also generate compressed air. Accordingly, the engines 48 may be consider air sources or compressors.

The engines 48 may generate compressed air in any suitable manner. For example, a jet engine may generate exhaust gases. A portion of the exhaust gases may be collected or diverted as compressed air into a compressed air system 100. Alternatively, air may be bled from the compressor portion of a jet engine to form a flow of compressed air.

In other embodiments, each of the engines 48 may comprise a turbofan engine 62. Air from the fan of the turbofan engine 62 (i.e. the bypass air) may be collected or diverted as compressed air into a compressed air system 100. In still other embodiments, a flow of compressed air may be generated by one or more dedicated engines or motors whose sole purpose is not to generate thrust in the direction 76 of flight, but rather to generate compressed air for the tip jets 50.

In the illustrated embodiment, each of the four engines 48a, 48b, 48c, 48d comprises a turboprop engine. Each engine 48a, 48b, 48c, 48d drives a propeller 102 on one side and a compressor 104a, 104b, 104c, 104d on the other. In such an embodiment, each compressor 104a, 104b, 104c, 104d may be connected to the corresponding engine 48a, 48b, 48c, 48d via a clutch. When air from the compressor 104 is no longer needed, the compressor 104 may be disengaged from the corresponding engine 48. Accordingly, a rotorcraft 10 in accordance with the present invention may be equipped with one or more engines 48 providing both thrust in the direction 76 of flight and compressed air for the tip jets 50.

A compressed air system 100 in accordance with the present invention may include a network of conduits interconnecting each source of compressed gas with each tip jet 50. Accordingly, any air source may provide compressed air to any tip jet 50. The network may include one or more outlets corresponding to each of the sources of compressed air. Compressed air may leave each source through such an outlet. An incoming conduit 54 may then conduct compressed air from the outlet to the plenum 56. In the illustrated embodiment, one incoming conduit 54a, 54b, 54c, 54d is dedicated to each of the four sources of compressed air.

A plenum 56 in accordance with the present invention may have any suitable configuration. In selected embodiments, a plenum 56 may include or define a volume sufficiently large such that the pressure drop imposed thereby is sufficiently small. Accordingly, the interior dimensions of a plenum 56 may be greater (e.g., significantly greater) than those of the individual incoming conduits 54. Additionally, a plenum 56 may be larger, both in length and girth, for larger rotorcraft 10.

A plenum 56 may be situated within a rotorcraft 10 to optimize the flow of compressed air from the one or more sources to the one or more rotors 40. In the illustrated embodiment, the air sources (i.e., engines 48a, 48b 48c, 48d) and rotors 40a, 40b are distributed across a main wing 14. Accordingly, to minimize the amount of ducting 54, 55 and associated pressure drop, a plenum 56 for the illustrated rotorcraft 10 may be sized and oriented to extend laterally within the wing 14 from one side of the rotorcraft 10 to the other.

Compressed air may exit a plenum 56 via one or more outgoing conduits 55a, 55b. The outgoing conduits 55 may conduct compressed air from the plenum 56 to the various rotors 40. In the illustrated embodiment, one outgoing conduit 55a, 55b is dedicated to each of the two rotors 40a, 40b.

Within each rotor 40, the compressed air may be delivered to the hub 44. The hub 44 of a rotor 40 may act as a manifold, feeding compressed air into the interior conduits 60 of the various rotor blades 42. Fuel may also be feed through the rotor blade 42 to the tip jet 50. This may be done through a conduit or pipe separate from the conduit 60 conducting the compressed air. Burning the fuel at the tip jet 50 within the flow of compressed air may generate thrust for powering rotation of the rotor 40.

Safe and continuous hover, forward flight, and the like require safe and continuous powering of the one or more rotors 40 of a rotorcraft 10. Accordingly, a compressed air system 100 in accordance with the present invention may continue to provide sufficient compressed air to the tip jets 50 after the failure of one or more of the sources of the compressed air. For example, a compressed air system 100 may include a control subsystem comprising various valves 106 controlling airflow and preventing back flow into an air source that is not running properly.

That is, without remedial action, a non-functioning air source may effectively form a significant and debilitating leak in a compressed air system 100. Accordingly, valves 106 may be position within a compressed air system 100 to resist or prevent back flow through the incoming conduits 54. In the illustrated embodiment, at least one such valve 106a, 106b, 106c, 106d may be positioned within each of the incoming conduits 54a, 54b, 54c, 54d.

Valves 106 in accordance with the present invention may function in any suitable manner. Valves 106 may also be motivated or actuated in any suitable manner. In selected embodiments, valves 106 may operate automatically based on pressure differentials or directions of flow thereacross. For example, one or more valves 106 in accordance with the present invention may be flapper valves. Alternatively, valves 106 may be electronically, pneumatically, or hydraulically actuated based on certain sensed criteria. Sensed criteria may include air pressure, air speed, direction of air flow, rotations per minute of an air source, temperature of an air source, and the like.

Should an engine 48a fail, the other engines 48b, 48c, 48d providing compressed air may operate at over one hundred percent performance for a period of time sufficient for a safe landing of the rotorcraft 10. Alternatively, or in combination therewith, fuel may be provided to the tip jets 50 at a greater rate, enabling the tip jets 50 to operate at higher than normal performance over the same period of time. Accordingly, with more sources of additional, emergency power, systems 100 in accordance with the present invention may more easily cope with engine failure than current multi-engine rotorcraft.

Figure 6:
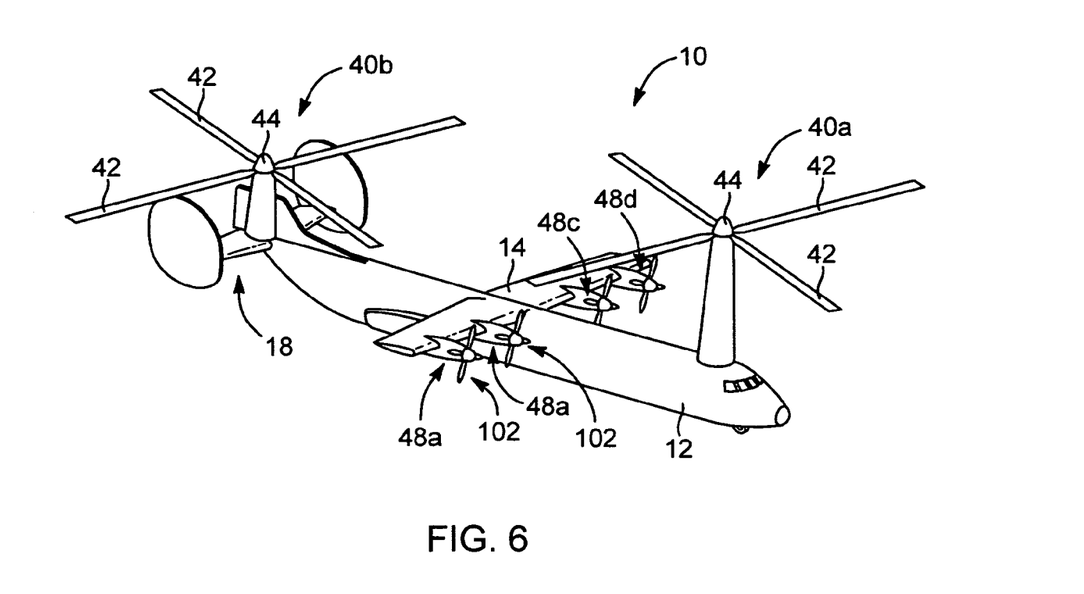
FIG. 6 is a perspective view of another alternative embodiment of a rotorcraft in accordance with the present invention, the rotorcraft having four engines and two four-bladed rotors, one of the two rotors being positioned fore and the other aft.
Figure 7:
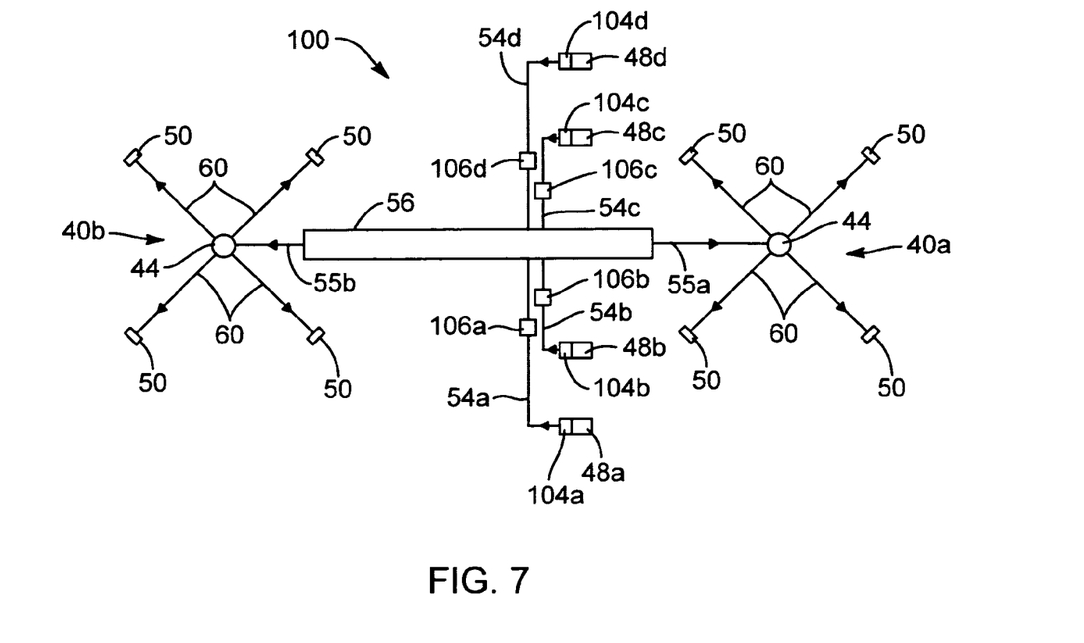
FIG. 7 is a schematic diagram of one embodiment of a compressed air system for use in the rotorcraft of FIG. 6.

Referring to FIGS. 6 and 7, as set forth hereinabove, a plenum 56 may be situated within a rotorcraft 10 to optimize the flow of compressed air from the one or more sources to the one or more rotors 40. In the illustrated embodiment, the air sources (i.e., engines 48a, 48b 48c, 48d) are distributed across a main wing 14. However, the rotors 40a, 40b are positioned fore and aft on the airframe 12. Accordingly, to minimize the amount of ducting 54, 55 and associated pressure drop, a plenum 56 for the illustrated rotorcraft 10 may be sized and oriented primarily longitudinally within the main body portion of the airframe 12.

Figure 8:
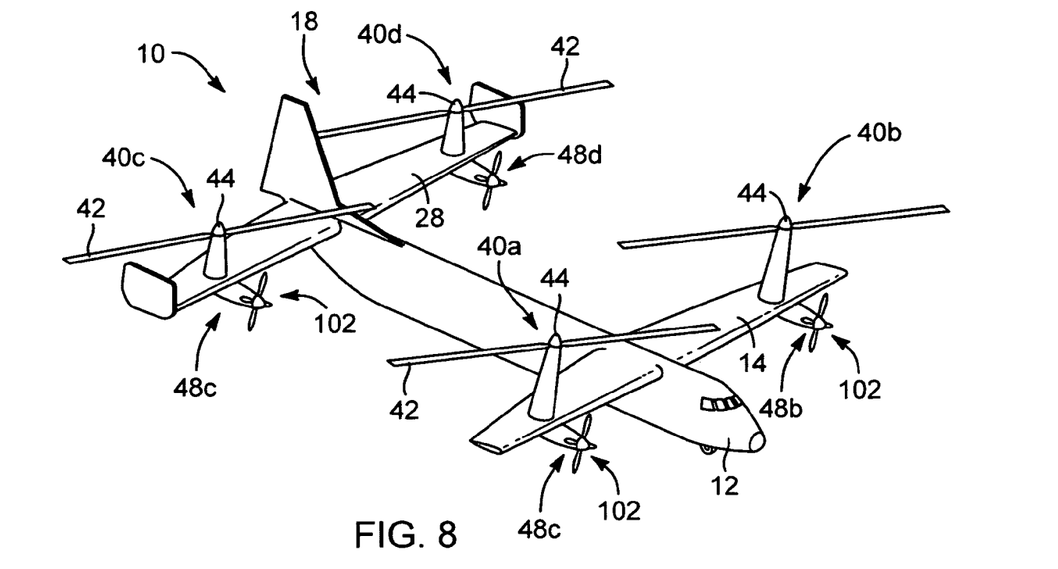
FIG. 8 is a perspective view of another alternative embodiment of a rotorcraft in accordance with the present invention, the rotorcraft having four engines and four two-bladed rotors.
Figure 9:
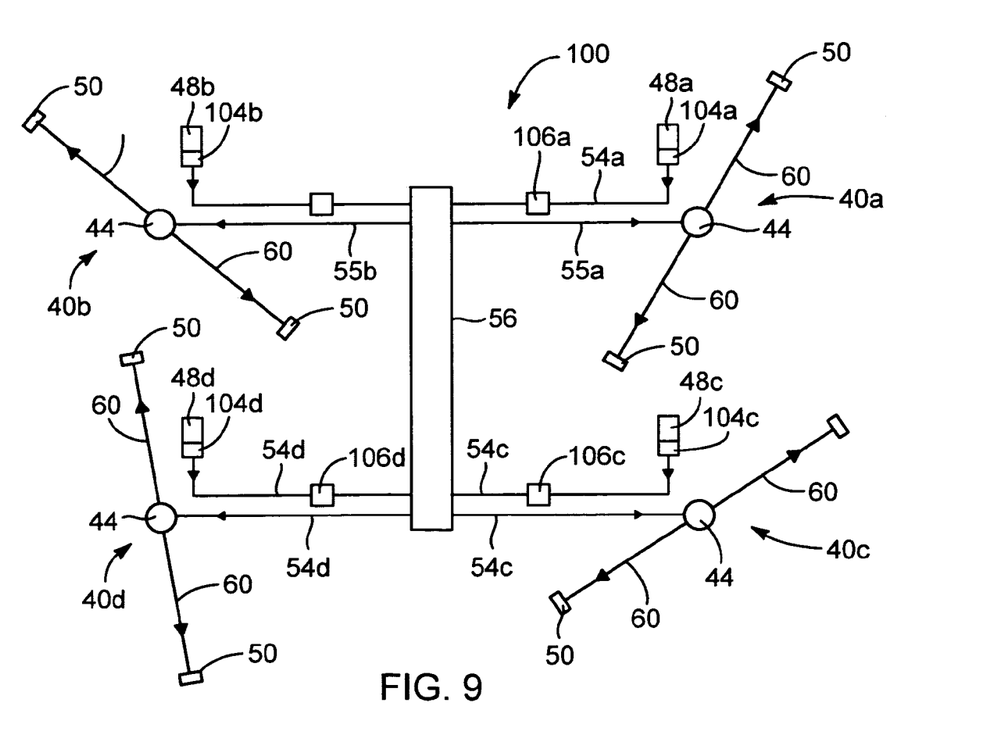
FIG. 9 is a schematic diagram of one embodiment of a compressed air system for use in the rotorcraft of FIG. 8.

Referring to FIGS. 8 and 9, in the illustrated embodiment, the air sources (i.e., engines 48a, 48b 48c, 48d) are positioned proximate the outboard extremes of both the front and back wings 14, 28. The rotors 40a, 40b, 40c, 40d are similarly positioned. Accordingly, to minimize the amount of ducting 54, 55 and associated pressure drop, a plenum 56 for the illustrated rotorcraft 10 may be sized and oriented to extend primarily longitudinally within the main body portion of the airframe 12.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A rotorcraft comprising:
   an airframe;
   at least one rotor connected to the airframe and comprising
      a hub, and
         at least one rotor blade having a root, tip opposite the root, and tip jet located at the tip;
   a plurality of compressors, each connected to the airframe and having an outlet for compressed air;
   a network of conduits connected to the airframe and connecting every outlet of the plurality of compressors with every tip jet of the at least one rotor; and
   a control system preventing back flow through each outlet of the plurality of compressors by
      detecting automatically a failure of a compressor of the plurality of compressors,
      automatically preventing back flow through the compressor in response to the detecting the failure, and
      increasing fuel flow to the at least one tip jet in response to the detecting.

2. The rotorcraft of claim 1, wherein the plurality of compressors comprises at least one jet engine.

3. The rotorcraft of claim 2, wherein the compressed air passing through the outlet corresponding to the at least one jet engine and into the network of conduits comprises exhaust gas from the at least one jet engine.

4. The rotorcraft of claim 2, wherein the compressed air passing through the outlet corresponding to the at least one jet engine and into the network of conduits comprises air bled from a compressor portion of the at least one jet engine.

5. The rotorcraft of claim 2, wherein:
   the at least one jet engine comprises a turbofan; and
   the compressed air passing through the outlet corresponding to the at least one jet engine and into the network of conduits comprises air from the fan of the turbofan.

6. The rotorcraft of claim 5, wherein the compressed air passing through the outlet corresponding to the at least one jet engine and into the network of conduits comprises substantially all of the air from the fan of the turbofan.

7. The rotorcraft of claim 1, wherein the plurality of compressors comprises at least one engine dedicated substantially exclusively to the generation of compressed air for one or more tip jets of the at least one rotor.

8. The rotorcraft of claim 1, wherein the plurality of compressors comprises at least one compressor driven by a turboprop engine.

9. The rotorcraft of claim 8, wherein the turboprop engine drives both the at least one compressor and a propeller.

10. The rotorcraft of claim 9, further comprising a clutch for selectively disengaging the at least one compressor from the turboprop engine.

11. The rotorcraft of claim 1, wherein the control system comprises a plurality of valves distributed within the network of conduits.

12. The rotorcraft of claim 11, wherein the network of conduits comprises:
   a plenum;
   a plurality of incoming ducts, each connecting a different outlet of the plurality of compressors to the plenum;
   outgoing ducting connecting the hub to the plenum; and
   an interior conduit extending within each blade of the at least one rotor blade to connect a corresponding tip jet to the hub.

13. The rotorcraft of claim 12, wherein the plurality of valves comprises at least as many valves as there are outlets of the plurality of compressors.

14. The rotorcraft of claim 13, wherein a different valve of the plurality of valves is positioned within each incoming duct of the plurality of incoming ducts.

15. A rotorcraft comprising:
   an airframe;
   a rotor connected to the airframe and comprising
      a hub, and
         at least two rotor blades having a root, tip opposite the root, and tip jet located at the tip;
   at least two turbofan engines, each connected to the airframe and having a fan portion and an outlet portion, the outlet portion receiving a portion or substantially all of the compressed air generated by the fan portion;
   a network of conduits connected to the airframe and connecting every outlet of the at least two turbofan engines with every tip jet of the rotor; and
   a control system preventing back flow through the outlets of the at least two turbofan engines by
      detecting automatically a failure of a turbofan engine of the at least two turbofans;
      automatically preventing back flow through the compressor in response to the detecting, and
      increasing fuel flow to the at least one tip jet in response to the detecting.

16. A method comprising:
   identifying a rotorcraft comprising
      at least one rotor having tip jets,
      a plurality of compressors, each having an outlet for compressed air,
      a network of conduits connecting every outlet of the plurality of compressors with every tip jet of the at least one rotor, and
      a control system;
   powering, by the tip jets, rotation of the at least one rotor;
   flying, during the powering, the rotorcraft;

experiencing during the flying a failure of at least one compressor of the plurality of compressors;

preventing, by the control system in response to the failure, back flow through the outlet corresponding to the at least one compressor; and increasing, in response to the failure, the amount of fuel delivered to the tip jets.

17. The method of claim 16, further comprising increasing, in response to the failure, the amount of compressed air generated by one or more compressors of the plurality of compressors.

18. The method of claim 17, further comprising increasing, in response to the failure, the amount of fuel delivered to the tip jets.

19. The method of claim 16, wherein:

the control system comprises a plurality of valves distributed within the network of conduits;

the network of conduits comprises a plenum, a plurality of incoming ducts, each connecting a different outlet of the plurality of compressors to the plenum, outgoing ducting connecting the hub to the plenum, and an interior conduit extending within each blade of the at least one rotor to connect a corresponding tip jet to the hub; and a different valve of the plurality of valves is positioned within each incoming duct of the plurality of incoming ducts.

\* \* \* \* \*